(12) United States Patent
Kim et al.

(10) Patent No.: US 10,500,821 B2
(45) Date of Patent: Dec. 10, 2019

(54) REAL WOOD FILM AND METHOD OF MANUFACTURING INJECTION-MOLDED REAL WOOD PRODUCT BY USING THE SAME

(71) Applicants: INTOPS CO., LTD., Anyang-si (KR); SAMBU FINE CHEMICAL CO., LTD., Gimhae-si (KR); Keunha Kim, Seoul (KR); Hee-dae Park, Busan (KR)

(72) Inventors: Keunha Kim, Seoul (KR); Jung Ah Choi, Siheung-si (KR); Sung Hoon Kim, Gunpo-si (KR); Hee-dae Park, Busan (KR)

(73) Assignees: INTOPS CO., LTD., Anyang-si (KR); SAMBU FINE CHEMICAL CO., LTD., Gimhae-si (KR)

( * ) Notice: Subject to any disclaimer, the term of this patent is extended or adjusted under 35 U.S.C. 154(b) by 149 days.

(21) Appl. No.: 15/641,442

(22) Filed: Jul. 5, 2017

(65) Prior Publication Data
US 2018/0222158 A1 Aug. 9, 2018

(30) Foreign Application Priority Data
Feb. 9, 2017 (KR) .................. 10-2017-0018208

(51) Int. Cl.
*B32B 21/10* (2006.01)
*B32B 5/02* (2006.01)
(Continued)

(52) U.S. Cl.
CPC ............ *B32B 21/10* (2013.01); *B29C 45/16* (2013.01); *B29C 45/72* (2013.01); *B32B 5/022* (2013.01);
(Continued)

(58) Field of Classification Search
CPC .............. B32B 21/10; B32B 5/022; B32B 7/12; B32B 21/14
See application file for complete search history.

(56) References Cited

U.S. PATENT DOCUMENTS

2002/0031620 A1* 3/2002 Yuzawa ............... B27D 1/00 428/1.1
2003/0004263 A1* 1/2003 Schmidt, Jr. .......... C08G 18/12 524/589
(Continued)

FOREIGN PATENT DOCUMENTS

JP H09-066536 A 3/1997
KR 10-2013-0105217 A 9/2013
(Continued)

*Primary Examiner* — Jeremy R Pierce
(74) *Attorney, Agent, or Firm* — KORUS Patent, LLC; Seong Il Jeong

(57) ABSTRACT

Disclosed herein are a real wood film and a method of manufacturing an injection-molded real wood product by using the real wood film. The real wood film includes: a sliced veneer; a non-woven fabric adhered to the bottom surface of the sliced veneer by means of a non-aqueous adhesive, and configured to protect the sliced veneer from moisture; a formation improvement layer adhered to the bottom surface of the non-woven fabric, and configured to prevent the sliced veneer from being wrinkled due to heat applied to the sliced veneer and prevent a crack from occurring; and a thermoplastic adhesive layer adhered to the bottom surface of the formation improvement layer, and configured to enable adhesion to injected resin.

5 Claims, 2 Drawing Sheets

(51) Int. Cl.
*B32B 7/12* (2006.01)
*B32B 21/14* (2006.01)
*B29C 45/16* (2006.01)
*B29C 45/72* (2006.01)
*B29L 7/00* (2006.01)

(52) U.S. Cl.
CPC ............... *B32B 7/12* (2013.01); *B32B 21/14* (2013.01); *B29L 2007/00* (2013.01); *B32B 2317/16* (2013.01)

(56) References Cited

U.S. PATENT DOCUMENTS

| | | |
|---|---|---|
| 2003/0162455 A1 | 8/2003 | Sano |
| 2010/0080968 A1 | 4/2010 | Mizuno et al. |
| 2015/0056446 A1* | 2/2015 | Ishiguro ................ C09J 167/02 428/355 R |
| 2015/0086747 A1* | 3/2015 | Beuchel ................. B32B 21/08 428/106 |
| 2015/0174853 A1 | 6/2015 | Jeon |

FOREIGN PATENT DOCUMENTS

| | | |
|---|---|---|
| KR | 10-2014-0040269 A | 4/2014 |
| KR | 10-1544817 B1 | 8/2015 |
| KR | 10-2016-0142427 A | 12/2016 |

\* cited by examiner

REAL WOOD FILM AND METHOD OF MANUFACTURING INJECTION-MOLDED REAL WOOD PRODUCT BY USING THE SAME

BACKGROUND

1. Technical Field

The present invention relates generally to a real wood film and a method of manufacturing an injection-molded real wood product by using the real wood film. More particularly, the present invention relates to a real wood film which can prevent sliced veneer from being deformed due to moisture, which can desirably maintain a shape after heat pressing, and which is more flexible than general sliced veneer and can prevent sliced veneer from being deformed despite the application of heat and pressure, thereby considerably improving formability, and also relates to a method of manufacturing an injection-molded real wood product by using the real wood film.

2. Description of the Related Art

Generally, interior materials (a door trim, a gearbox, a crush pad, an instrument panel, a center fascia panel, etc.) of vehicles are made of different materials in order to provide stylishness and luxuriousness. There is a tendency for vehicle makers to use various types of interior materials in order to satisfy the tastes and preferences of consumers. As an example, there is a tendency for the use of interior materials, each including a natural sliced veneer layer having luxuriousness and desirable aesthetic beauty, to increase.

Conventionally, an interior material for a vehicle is manufactured by fabricating a base material corresponding to the body of the interior material by injecting plastic resin, performing transfer by floating a film paper having a wood pattern on a transfer solution, attaching the transfer-processed film paper to one surface of the base material, and then cutting and trimming the film paper in accordance with the shape of the base material.

Furthermore, to minimize harmful components in the transfer-processed film paper, a washing process and a drying process must be performed. Accordingly, problems may arise in that the number of manufacturing processes is increased and manufacturing efficiency is decreased.

Another conventional interior material is manufactured by fabricating a base material corresponding to the body of the interior material by injecting plastic resin, forming two sliced veneers and one aluminum plate into thin plate shapes, accommodating the sliced veneers and the aluminum plate in a mold in the state in which the aluminum plate has been inserted between the sliced veneers, fabricating a natural sliced veneer layer in which the sliced veneers and the aluminum plate have been integrated by performing pressing at a predetermined temperature and a predetermined pressure, coating a surface of the natural sliced veneer layer, attaching the coated natural sliced veneer layer to one surface of the base material, and then cutting and trimming the natural sliced veneer layer in accordance with the shape of the base material.

Meanwhile, in the manufacturing method, the process of fabricating the natural sliced veneer layer and the process of coating the surface of the natural sliced veneer layer are performed by a single piece of equipment. For this reason, problems arise in that expensive equipment is required and, thus, manufacturing cost is increased.

Furthermore, although the aluminum plate disposed between the sliced veneers is used to ensure the rigidity of the natural sliced veneer layers, it is difficult to form the natural sliced veneer layers to have a desired curved surface or portion due to the aluminum plate when the curved surface or portion is present on the shape of the interior material. Accordingly, a problem arises in that the manufactured interior material has low product quality.

In connection with related technology intended to overcome the above problem, Korean Patent No. 10-1192271 (registered on Oct. 11, 2012) discloses a method of manufacturing a natural wood sliced veneer interior material for a vehicle, including the steps of: obtaining sliced veneer wood paper by cutting wet natural wood into a thickness of 0.1 to 1 mm by means of a knife and steaming the cut natural wood; obtaining a natural wood sliced veneer pattern layer having the pattern and grain of wood by superimposing a plurality of sheets of sliced veneer wood paper on top of another and compressing the plurality of sheets of sliced veneer wood paper by means of upper and lower plates in which protrusions have been formed on the opposite surfaces thereof; forming a resin layer by introducing the natural wood sliced veneer pattern layer into an injection mold and injecting resin to the back surface of the natural wood sliced veneer pattern layer backward; and coating the front surface of the natural wood sliced veneer pattern layer to which the resin has been injected backward with a transparent protective layer via the injection step using the injection mold.

However, the sliced veneer is problematic in that it is difficult to manufacture a product having desirable quality because the sliced veneer may be easily deformed while being expanded and contracted due to moisture, and in that a wrinkle may be generated along the grain of wood or a knot may protrude when the sliced veneer is deformed, with the result that the appearance of the sliced veneer becomes rough and poor.

SUMMARY

An object of the present invention is to provide a real wood film which can prevent the phenomenon in which sliced veneer is deformed or is contracted and wrinkled by applying a non-aqueous adhesive to a non-woven fabric adhered to the bottom surface of the sliced veneer in order to minimize deformation attributable to moisture, and which can improve moisture-proof/light-proof reliability and formability while maintaining the texture and appearance of real wood by including a formation improvement layer in order to desirably maintain a shape after heat pressing (pre-forming), thereby completely implementing the texture and appearance of the real wood, and to also provide a method of manufacturing an injection-molded real wood product by using the real wood film.

According to an aspect of the present invention, there is provided a real wood film, including: a sliced veneer; a non-woven fabric adhered to the bottom surface of the sliced veneer by means of a non-aqueous adhesive, and configured to protect the sliced veneer from moisture; a formation improvement layer adhered to the bottom surface of the non-woven fabric, and configured to prevent the sliced veneer from being wrinkled due to heat applied to the sliced veneer and prevent a crack from occurring; and a thermoplastic adhesive layer adhered to the bottom surface of the formation improvement layer, and configured to enable adhesion to injected resin.

The non-aqueous adhesive used to adhere the non-woven fabric to the sliced veneer may be formed by mixing an ester-based material and an ether-based material at a corresponding ratio.

The formation improvement layer may be made of any one of polycarbonate (PC), polyethylene terephthalate (PET), polyethylene terephthalate glycol-modified (PETG), acrylonitrile-butadiene-styrene (ABS), poly(methylmethacrylate) (PMMA), polyimide (PI), and polyethylene naphthalate (PEN).

A hot-melt material may be selectively disposed between the sliced veneer, the non-woven fabric, the formation improvement layer, and the thermoplastic adhesive layer.

According to another aspect of the present invention, there is provided a method of manufacturing an injection-molded real wood product, the method including: a) preparing the real wood film; b) forming the real wood film by means of a heat-press process; c) accommodating the formed real wood film inside an injection mold, and injecting resin to the back surface of the real wood film; and d) acquiring the real wood film in which the resin has been injected to the back surface of the real wood film inside the injection mold, and forming a protective layer by painting a surface of the real wood film.

The protective layer may be applied to the top surface of the sliced veneer, and may protect the surface of the sliced veneer from ultraviolet rays.

BRIEF DESCRIPTION OF THE DRAWINGS

The above and other objects, features and advantages of the present invention will be more clearly understood from the following detailed description taken in conjunction with the accompanying drawings, in which.

DETAILED DESCRIPTION

Figure 1:
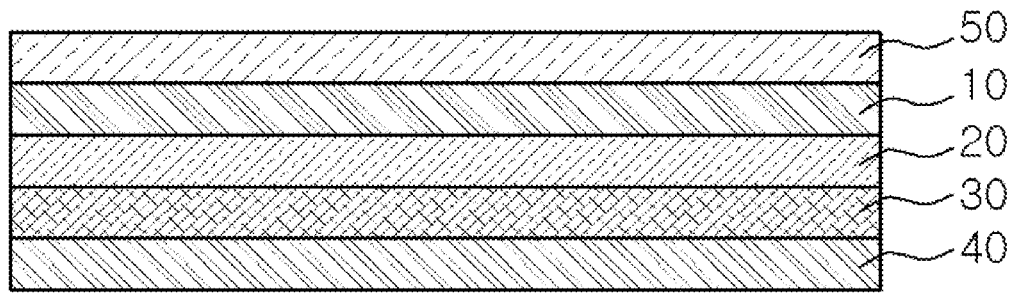
FIG. 1 is a sectional view showing a section of a real wood film according to an embodiment of the present invention.
Figure 2:
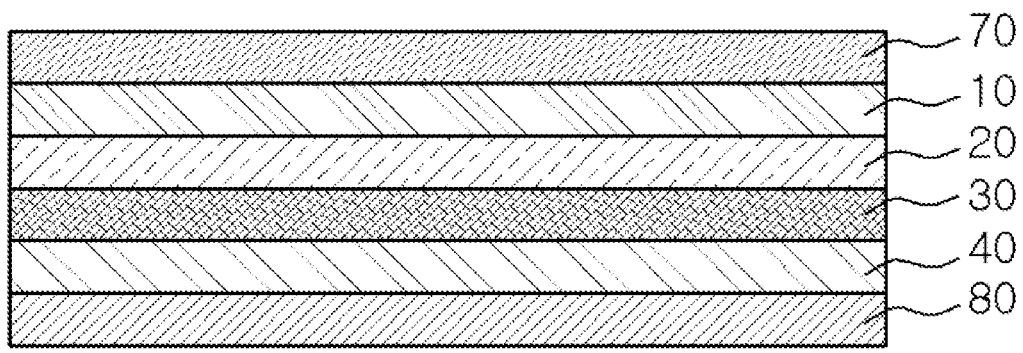
FIG. 2 is a sectional view showing an injection-molded real wood product to which a real wood film according to an embodiment of the present invention has been applied.

Preferred embodiments of the present invention will be described in detail with reference to the accompanying drawings below. Prior to the following description, the terms and words used in the present specification and the attached claims should not be limitedly interpreted as having common and dictionary meanings, but should be interpreted as having meanings and concepts conforming to the technical spirit of the present invention based on the principle that an inventor can appropriately define the concepts of terms and words in order to describe his or her invention in the best way.

Accordingly, since the embodiments described in the present specification and the configurations shown in the drawings are merely the most preferred embodiments of the present invention and do not represent the overall technical spirit of the present invention, it should be appreciated that there may be various equivalents and modifications that may replace the embodiments and the configurations when the present application is filed.

The present invention is directed to a real wood film which can prevent sliced veneer from being deformed due to moisture, which can desirably maintain a shape after heat pressing, and which is more flexible than general sliced veneer and can prevent sliced veneer from being deformed despite the application of heat and pressure, thereby considerably improving formability, and is also directed to a method of manufacturing an injection-molded real wood product by using the real wood film. The real wood film and the method of manufacturing an injection-molded real wood product by using the real wood film will be described in detail with reference to the accompanying drawings below.

A real wood film 100 according to an embodiment of the present invention includes a sliced veneer 10, a non-woven fabric 20, a formation improvement layer 30, and a thermoplastic adhesive layer 40. First, the sliced veneer 10 functions to represent the texture of wood. The sliced veneer 10 is formed by cutting natural wood into a thickness of 0.1 to 1 mm, and is used as a finishing material intended to represent a pattern and characteristics intrinsic to wood.

The sliced veneer 10 is the same as common sliced veneer, and a detailed description thereof will be omitted.

Furthermore, in the real wood film 100 according to the embodiment of the present invention, the non-woven fabric 20 is adhered to the bottom surface of the sliced veneer 10 by means of a non-aqueous adhesive. The sliced veneer 10 may be easily deformed while it is being expanded and contracted due to moisture infiltrating through a surface thereof. When the sliced veneer 10 is deformed, a wrinkle is formed along the grain of wood or a knot is caused to protrude, and thus the appearance thereof becomes rough and poor.

The non-woven fabric 20 functions to prevent the sliced veneer 10 from being deformed due to moisture. The non-woven fabric 20 is adhered to the bottom surface of the sliced veneer by means of a non-aqueous adhesive, and thus prevents the phenomenon in which the sliced veneer 10 is deformed or contracted due to moisture and is then wrinkled.

In this case, the non-aqueous adhesive used to adhere the non-woven fabric 20 is formed by mixing an ester-based urethane adhesive with an ether-based urethane adhesive, having adhesive force which does not decrease despite moisture, at an optimum ratio.

In this case, when only the ester-based adhesive is used for the non-woven fabric 20, adhesive force is desirable, but adhesive force related to sliced veneer may decrease due to hydrolysis when moisture infiltrates. By applying the ether-based adhesive, i.e., a component in which a hydrolysis reaction does not occur, the adhesive force between the sliced veneer 10 and the non-woven fabric 20 is prevented from decreasing when moisture infiltrates.

In this case, the moisture-proof reliability for each ratio between an ester-based material and an ether-based material can be seen from Tables 1 and 2 below:

TABLE 1

Moisture-proof reliability (composition, thermal characteristics, and adhesion)

| Item | Unit | NASA-A | NASA-A1 | NASA-A2 | NASA-A3 | NASA-A4 | Remarks |
|---|---|---|---|---|---|---|---|
| Polyol composition | | polyester 100% | polyester 25% polyether 75% | polyester 50% polyether 50% | polyester 75% polyether 25% | polyester 85% polyether 15% | |
| Isocyanate composition | | MDI | MDI | MDI | MDI | MDI | |
| Flow starting temperature (Tfb) | °C. | 121.5 | 120.4 | 120.7 | 119.8 | 118.9 | ASTM D 3835 |
| Melt index (MFI) | g/10 min 177° C., 2.16 kgf | 11.4 | 10.5 | 12.2 | 10.8 | 12.3 | ASTM D 1238 |
| Adhesion test results | kgf/cm | 3.4~4.0 | 1.2~1.8 | 2.0~2.5 | 2.5~3.0 | 2.8~3.4 | |

In Table 1, as can be seen from the test results, NASA-A to which only polyester polyol has been applied exhibited the most excellent adhesive force, and the result in which adhesive force decreased in proportion to the use of polyether polyol was obtained.

Furthermore, the hydrolysis properties of specimens formed by adhering samples were evaluated, and the most appropriate mixtures are listed in Table 2 below:

TABLE 2

Moisture-proof reliability (composition, and hydrolysis tests)

| Item | Unit | NASA-A | NASA-A1 | NASA-A2 | NASA-A3 | NASA-A4 | Remarks |
|---|---|---|---|---|---|---|---|
| Polyol composition | | Polyester 100% | Polyester 25% Polyether 75% | Polyester 50% Polyether 50% | Polyester 75% Polyether 25% | Polyester 85% Polyether 15% | |
| Isocyanate composition | | MDI | MDI | MDI | MDI | MDI | |
| Adhesion test results | kgf/cm | 3.4~4.0 | 1.2~1.8 | 2.0~2.5 | 2.5~3.0 | 2.8~3.4 | |
| Adhesion results after hydrolysis test (one week) | kgf/cm | 1.0~1.5 | 1.2~1.5 | 1.8~2.3 | 2.2~2.5 | 2.0~2.3 | |
| Adhesion results after hydrolysis test (two weeks) | kgf/cm | 0.3~0.5 | 1.1~1.4 | 1.7~2.1 | 2.0~2.3 | 1.7~2.2 | |

In this case, the specimens were stored in an oven at a temperature of −80° C. and a humidity of 90% for one week or for two weeks, and were then subjected to adhesion tests. As a result of these tests, it can be seen that when polyester 25% was introduced, hydrolysis properties were improved and adhesive force was not significantly reduced.

Accordingly, in the real wood film 100 according to the present invention, the non-woven fabric 20 is impregnated with an adhesive formed by mixing an ester-based material and an ether-based material at a ratio of 75:25, and the non-woven fabric 20 sufficiently coated with the adhesive is adhered to the bottom surface of the sliced veneer 10, thereby preventing the phenomenon in which the sliced veneer 10 is deformed or contracted due to moisture.

Furthermore, the formation improvement layer 30 is adhered to the bottom surface of the non-woven fabric 20. The formation improvement layer 30 prevents the sliced veneer 10 from being wrinkled and prevents a crack from occurring due to thermal deformation during the heat pressing of the sliced veneer 10.

In this case, the formation improvement layer 30 is preferably made of any one of polycarbonate (PC), polyethylene terephthalate (PET), polyethylene terephthalate glycol-modified (PETG), acrylonitrile-butadiene-styrene (ABS), poly(methylmethacrylate) (PMMA), polyimide (PI), and polyethylene naphthalate (PEN).

In this case, in connection with the present invention, per-thickness formability was tested based on polyethylene terephthalate (PET), and the results of the test are listed in Table 3 below:

TABLE 3

| Item | Unit | PET A | PET B | PET C | Remarks |
|---|---|---|---|---|---|
| PET film thickness | μm | 50 | 75 | 100 | |
| Adhesive force between upper and lower layers | | desirable | desirable | desirable | |
| Processability | | Since the film is thin, the | desirable | desirable | |

TABLE 3-continued

| Item | Unit | PET A | PET B | PET C | Remarks |
|---|---|---|---|---|---|
| during adhesion process | | phenomenon in which the film overlaps itself or is torn occurs when it is processed. | | | |
| Formability (after the formation of the multilayer) | | Since the film is thin, the phenomenon in which the film overlaps itself or is torn often occurs when it is injected. | desirable | desirable | |

As can be seen from the above results, PET layers of 75 μm and 100 μm exhibited desirable results. Accordingly, to improve stability, it is preferable to apply a thickness of 100 μm.

Furthermore, the thermoplastic adhesive layer 40 is adhered to the bottom surface of the formation improvement layer 30. The thermoplastic adhesive layer 40 functions to enable adhesion to injected resin. The material of the thermoplastic adhesive layer 40 includes diisocyanates-based materials, long-chain diols(polyol)-based materials, and chain extenders-based materials. Among the diisocyanates-based materials, any one of diphenylmethane diisocyanate (MDI), tolune diisocyanate (TDI), hexamethylene diisocyanate, isophorone diisocyanateiisocyanate (IPDI), and dicyclohexylmethane-4,4'-diisocyanate (H12MDI) is preferably used. Among the long-chain diols(polyol)-based materials, any one of polytetramethylene ether glycol (PTMEG), polyoxypropylene glycol (PPG), and polyoxyethylene glycol (PEG) is preferably used. Among the chain extenders-based materials, 1,4-butanediol is preferably used.

Figure 3:
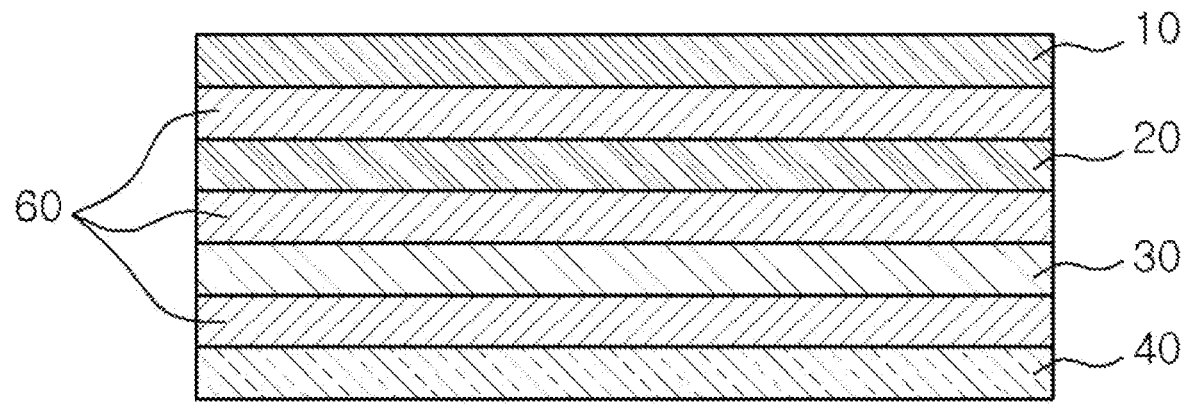
FIG. 3 is a sectional view showing a section of a real wood film according to another embodiment of the present invention.
Figure 4:
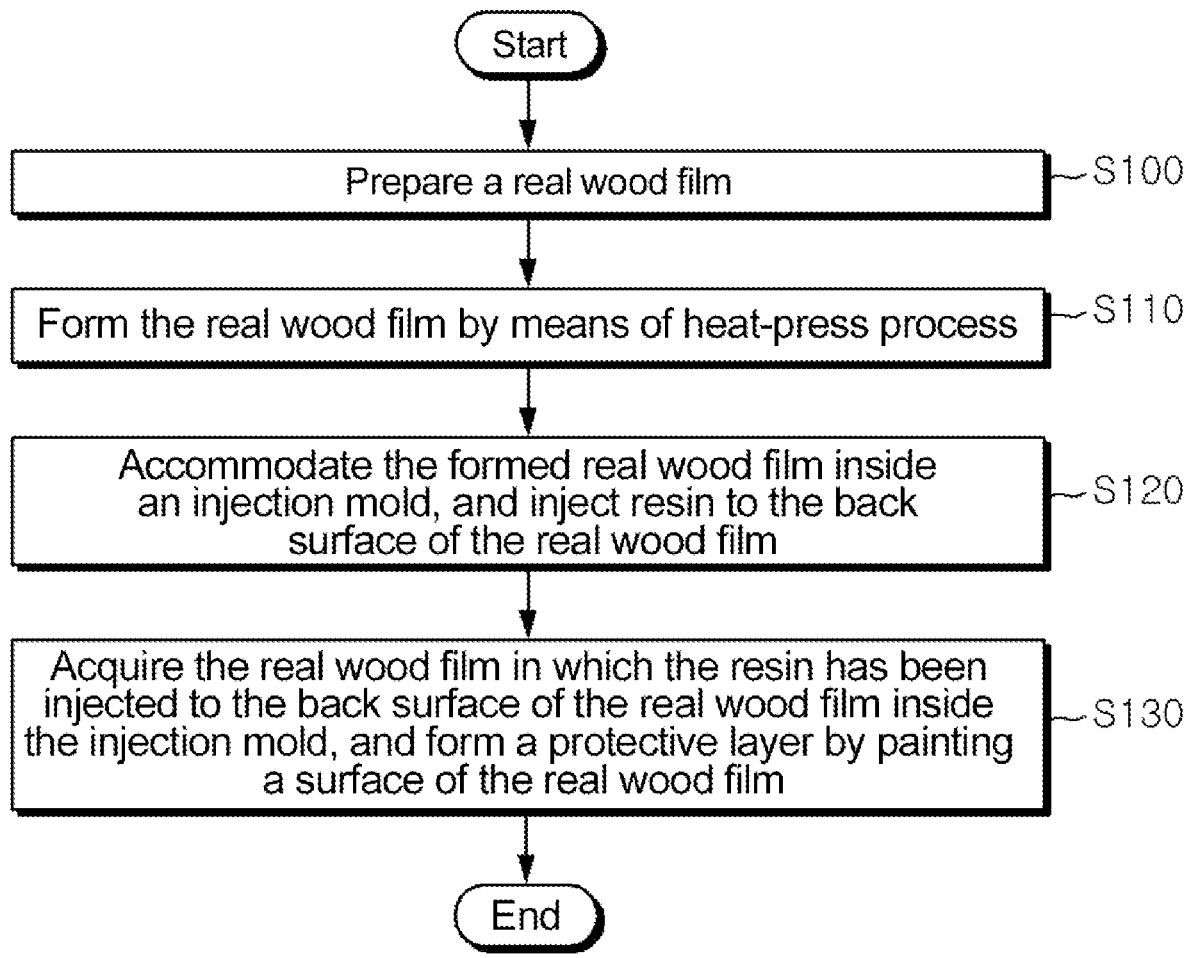
FIG. 4 is a block diagram showing the steps of a method of manufacturing an injection-molded real wood product by using the real wood film according to an embodiment of the present invention.

Furthermore, as shown in FIG. 3, the real wood film 100 according to the embodiment of the present invention may be formed by selectively disposing hot-melt films 60 between the sliced veneer 10, the non-woven fabric 20, the formation improvement layer 30, and the thermoplastic adhesive layer 40 and melting the hot-melt films 60 at high temperature, thereby adhering the sliced veneer 10, the non-woven fabric 20, the formation improvement layer 30, and the thermoplastic adhesive layer 40 to each other.

In this case, although the hot-melt films 60 may be disposed all between the sliced veneer 10 and the non-woven fabric 20, between the non-woven fabric 20 and the formation improvement layer 30, and between the formation improvement layer 30 and the thermoplastic adhesive layer 40, may be melted at high temperature and may function as interlayer adhesives, the disposition of the hot-melt films 60 is not limited thereto. Alternatively, such a hot-melt films 60 may be disposed only between the sliced veneer 10 and the non-woven fabric 20, between the non-woven fabric 20 and the formation improvement layer 30, or between the formation improvement layer 30 and the thermoplastic adhesive layer 40.

Furthermore, in the real wood film 100 according to the embodiment of the present invention, the top surface of the sliced veneer 10 is finished by temporarily attaching a carrier film 50 on the surface of the sliced veneer 10, thereby preventing the sliced veneer 10 from being damaged during the process of forming a real wood film.

A method of manufacturing an injection-molded product by using the real wood film 100 according to an embodiment of the present invention will be described below:

First, at step a) S100, the real wood film 100 is prepared.

In this case, the prepared real wood film 100 includes: the sliced veneer 10 formed to have a thickness of 0.2 to 0.5 mm; the non-woven fabric 20 adhered to the bottom surface of the sliced veneer 10 by means of a non-aqueous adhesive, and configured to protect the sliced veneer 10 from moisture; the formation improvement layer 30 adhered to the bottom surface of the non-woven fabric 20, and configured to prevent the sliced veneer 10 from being wrinkled due to heat applied to the sliced veneer 10 and prevent a crack from occurring; and the thermoplastic adhesive layer 40 adhered to the bottom surface of the formation improvement layer 30, and configured to enable adhesion to injected resin.

Furthermore, the carrier film 50 is temporarily attached to a surface of the real wood film 100 according to the embodiment of the present invention.

Furthermore, at step b) S110, the real wood film 100 prepared at step a) S100 is formed by a heat-press process.

In this case, the real wood film 100 is accommodated inside a press mold in which the mold parts thereof engage with each other in a vertical or lateral direction, and heat pressing is performed for about 10 seconds while applying heat at a corresponding temperature of 150 to 250° C., thereby forming the real wood film 100 to a corresponding shape so that the real wood film 100 has a curved shape.

Furthermore, at step c) S120, the real wood film 100 formed at step b) S110 is accommodated in an injection mold, and resin is injected to the back surface of the real wood film 100.

In this case, the real wood film 100 from which the carrier film 50 has been removed is accommodated inside the injection mold in which the mold parts thereof engage with each other in a vertical or lateral direction, and then resin 80 is injected to the back surface of the real wood film 100, i.e., the surface of the real wood film 100 on which the thermoplastic adhesive layer 40 has been stacked.

Moreover, at step d) S130, after the real wood film 100 in which the resin 80 had been injected to the back surface thereof inside the injection mold has been acquired at step c) S120, a protective layer 70 is formed by painting a surface of the real wood film 100.

In this case, the protective layer 70 applied to the top surface of the sliced veneer 10 functions to protect a surface of the sliced veneer 10 from ultraviolet rays.

The real wood film and the method of manufacturing an injection-molded real wood product by using the real wood film according to the present invention have the following effects:

In other words, the real wood film and the method of manufacturing an injection-molded real wood product by using the real wood film have the effect of being capable of preventing the phenomenon in which sliced veneer is deformed or contracted and is wrinkled by applying the non-aqueous adhesive to the non-woven fabric adhered to the bottom surface of the sliced veneer in order to minimize deformation attributable to moisture, and also have the effect of being capable of improving moisture-proof/light-proof reliability and formability while maintaining the texture and appearance of real wood by including the formation improvement layer in order to desirably maintain a shape after heat pressing (pre-forming), thereby completely implementing the texture and appearance of the real wood.

Although the present invention has been described with reference to the embodiments shown in the diagrams, these embodiments are merely illustrative. It will be apparent to those having ordinary knowledge in the art to which the present invention pertains that various modifications and other equivalent embodiments may be made from the above description. Accordingly, the true technical protection range of the present invention should be defined based on the technical spirit of the attached claims.

What is claimed is:

1. A real wood film, comprising:
a sliced veneer;
a non-woven fabric adhered to a bottom surface of the sliced veneer by means of a non-aqueous adhesive, and configured to protect the sliced veneer from moisture;
a formation improvement layer adhered to a bottom surface of the non-woven fabric, and configured to prevent the sliced veneer from being wrinkled due to heat applied to the sliced veneer and prevent a crack from occurring; and
a thermoplastic adhesive layer adhered to a bottom surface of the formation improvement layer, and configured to enable adhesion to injected resin,
wherein the non-aqueous adhesive used to adhere the non-woven fabric to the sliced veneer is formed by mixing an ester-based urethane material and an ether-based urethane material, and
wherein the formation improvement layer is made of polyethylene terephthalate (PET) and has a thickness of 75 µm to 100 µm to keep desirable formability.

2. The real wood film of claim 1, wherein the non-aqueous adhesive is formed by mixing the ester-based urethane material and the ether-based urethane material at a ratio of 75:25.

3. The real wood film of claim 1, wherein a hot-melt material is selectively disposed between the sliced veneer, the non-woven fabric, the formation improvement layer, and the thermoplastic adhesive layer.

4. A method of manufacturing an injection-molded real wood product, the method comprising:
a) preparing the real wood film set forth in claim 1;
b) forming the real wood film by means of a heat-press process;
c) accommodating the formed real wood film inside an injection mold, and injecting resin to a back surface of the real wood film; and
d) acquiring the real wood film in which the resin has been injected to the back surface of the real wood film inside the injection mold, and forming a protective layer by painting a surface of the real wood film.

5. The method of claim 4, wherein the protective layer is applied to a top surface of the sliced veneer, and protects the surface of the sliced veneer from ultraviolet rays.

* * * * *